United States Patent Office 3,338,788
Patented Aug. 29, 1967

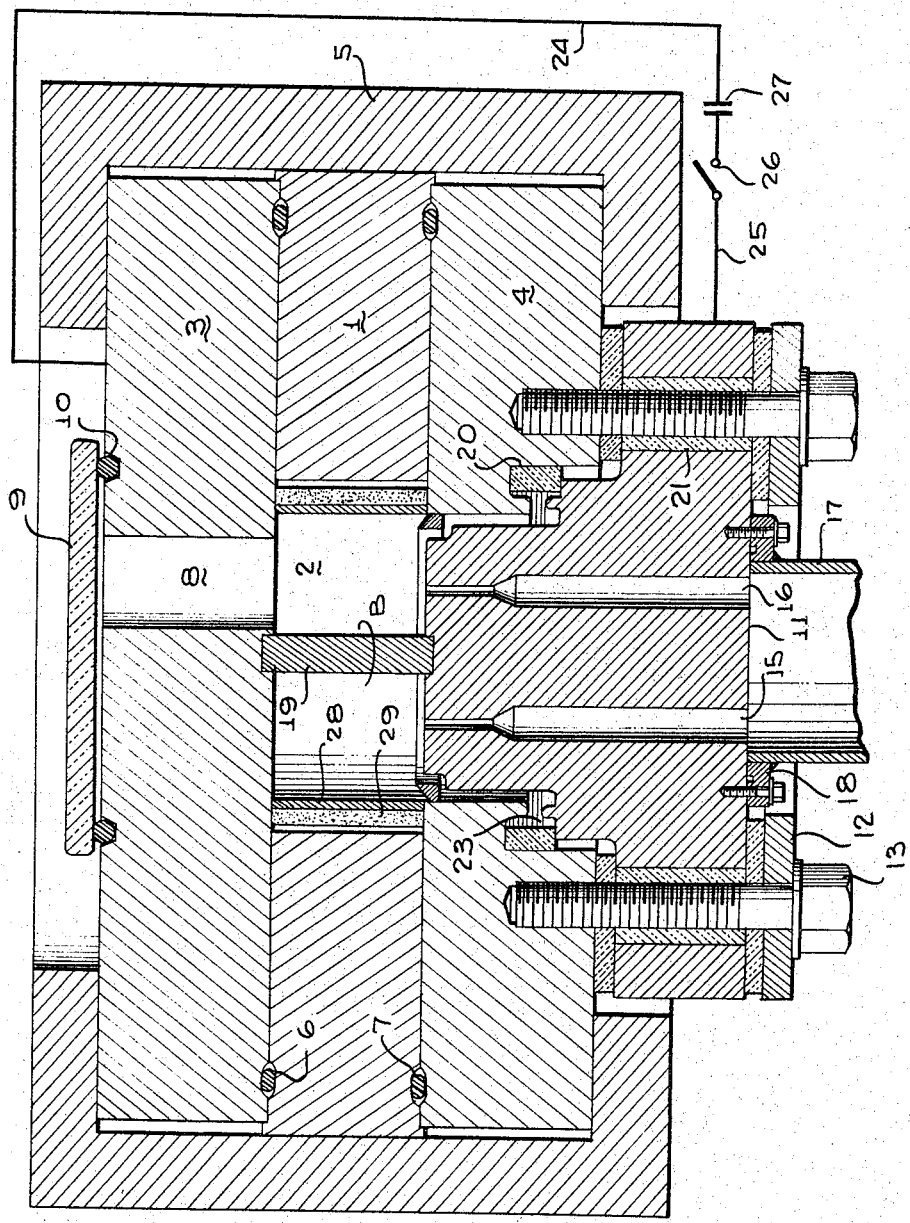

3,338,788
APPARATUS FOR PRODUCING HIGH INTENSITY MAGNETIC FIELDS FOR USE IN CONTROLLED THERMONUCLEAR REACTIONS
Jiri George Linhart, Frascati, Italy, assignor to European Atomic Energy Community (Euratom), Brussels, Belgium
Filed Jan. 22, 1962, Ser. No. 167,837
6 Claims. (Cl. 176—1)

The present invention relates to means for utilizing explosives as a source of energy of high density, and more particularly, it relates to their use for the production of magnetic fields of high intensity. The invention relates primarily to means of producing such magnetic fields in order to confine a plasma in which it is desired to produce controlled thermonuclear fusion reactions.

Various systems for confining plasmas by intense magnetic fields have previously been proposed; examples of such systems are described in particular in Belgian Patent No. 592,646, issued July 5, 1960, in the name of J. G. Linhart, entitled "Proces and Apparatus for Producing Intense Magnetic Fields for the Confinement of a Plasma."

It is known (see "Plasma Physics," J. G. Linhart, North-Holland Publishing Co., Amsterdam, 1960) that the magnetic field B necessary to confine a plasma for a very short period of time is given by the equation $$B^2 = 16\pi nkT$$

in which $n$ is the ion density of the plasma and $T$ is its absolute temperature, $k$ being the Boltzmann constant ($1.38 \cdot 10^{-16}$ ergs/degree); the corresponding magnetic pressure $p$ is then given by:

$$p = 2nkT + \frac{B^2}{8\pi}$$

For values of the order of those associated with nuclear fusion experiments, namely, for example $$n = 10^{20} \text{ ions/cm.}^3$$

and $T = 5 \cdot 10^8$ degrees K. the following values of B and $p$ will be obtained:

$$B = 18.6 \cdot 10^6 \text{ gausses}$$
$$p = 13.8 \cdot 10^6 \text{ bars}$$

However, in order to obtain a positive energy balance which can be utilized in a thermonuclear reactor, the magnetic field must have a minimum value given by the formula (see the above mentioned patent):

$$B = \frac{2.8 \cdot 10^8}{(ro \cdot x \cdot Q)^{1/2}}$$

in which $ro$ is the minimum radius of the reaction zone, $x$ defines the time of confinement, and $Q$ is the quality factor of the energy recuperation circuit.

Typical values of these different parameters are:

$$ro = 0.1 \text{ cm.}$$
$$x = 100$$
$$Q = 1$$

Hence, $B = 88 \cdot 10^6$ gausses

A magnetic field of such an intensity is difficult to obtain by purely electromagnetic means.

In accordance with the present invention, an apparatus for the production of magnetic fields of high intensity comprises a cylindrical chamber in which an electric current traversing a central conductor creates an azimuthal field which is compressed by the implosion of a metal tube caused by the explosion of an outer annular layer of chemical explosive materials.

For the compression times contemplated (which are of the order of 10 microseconds), the magnetic flux is retained and the magnetic field increases in accordance with the ratio G, where $$G = \frac{B_{o2}}{B_{o1}} = \frac{W_c}{W_m} + 1$$

in which $B_{o1}$ and $B_{o2}$ are the values of the field at the surface of the central conductor at the start and at the end of the compression, respectively, $W_c$ is the initial kinetic energy of the metal tube, and $W_m$ is the magnetic energy initially stored.

The shortest distance $d_r$ between the central conductor and the metal tube at the time of its maximum radial excursion is given by $$d_r = \frac{ro}{G} \log \frac{R_1}{ro}$$

in which $ro$ is the radius of the central conductor and $R_1$ is the initial radius of the metal tube.

Finally, it can be shown that an envelope compressing an azimuthal field is stable, and, in particular, that it is more stable than an envelope compressing an axial field.

An example of the application of the present invention will now be described, by way of illustration and not of limitation, with reference to the annexed drawing, wherein the single figure is a vertical cross-sectional view of a typical magnetic compression apparatus constructed in accordance with the present invention.

The apparatus comprises a solid annular part 1 of steel, the outside diameter of which is 365 mm. The central cavity of this part constitutes the magnetic compression chamber 2. Said chamber 2, of a diameter of 130 mm. and a height of 60 mm., is covered by two solid end walls 3 and 4, also of steel. These two end walls are rigidly held against the part 1 by a massive inwardly flanged annular hoop 5, and a hermetic seal between the parts assembled in this manner is assured by the use of two toric sealing gaskets 6 and 7, as shown.

The upper end wall 3 has an opening 8 covered by a thick transparent window 9 intended for observation, said window being suitably secured to member 3 and the vacuum-tightness of which is assured by the use of a toric sealing gasket 10. The lower end wall 4 is bored at its center so as to receive a frame 11 which has several purposes, as follows:

Firstly, the frame 11 supports the entire apparatus described above, said frame being attached to a suitable supporting plate 12 by means of bolts, such as 13, screwed into the end wall 4.

Furthermore, the frame 11 is formed with passages such as 15 and 16, intended to permit the expansion of the products of the explosion and the exhaustion of the chamber 2, which is connected to vacuum pumps, not shown, through a conduit 17 fastened at 18 to the frame 11.

Finally, the frame 11 is employed as one of the electrodes feeding a central conductor 19 in accordance with the present invention; for this purpose, it is carefully insulated by the interposition of suitable insulating materials, such as 20, with respect to the end wall 4, 21 around the bolts 13, and with respect to the plate 12.

A sealing gasket 23 of the labyrinth type is provided inwardly adjacent the annular insulator 20.

The other electrode of the central conductor 19 comprises the end wall 3 itself. The electrical circuit comprises the conductors 24 and 25, the switch 26 and the capacitor bank 27. The latter has a capacitance of 2000 microfarads at 5 kilovolts, namely, a potential energy of 25 kilojoules.

The chamber 2 is surrounded, in accordance with the invention, by a metal tube 28, and between said tube and the part 1 there is rammed an annular explosive charge 29.

With a radius of the central conductor $r_0=1$ cm., an initial radius of the metal tube $R_1=6$ cm., an initial kinetic energy of the latter $W_c=550$ kj., an initially stored magnetic energy $W_m=5$ kj., and an initial magnetic field at the surface of the central conductor $B_{o1}=1.35 \cdot 10^5$ gauss, there is obtained an amplification of the magnetic field $G=110$, a final magnetic field at the surface of the central conductor $B_{o2}=1.5 \cdot 10^7$ gausses, a final pressure $p=9 \cdot 10^6$ bars, and the shortest distance between the central conductor and the metal envelope $d_r=0.16$ mm.

It will be apparent that the main feature of the present invention is the utilization of the high energy density obtained from chemical explosives as compared with that obtainable with other known means. By way of comparison, the density obtainable from the electric energy of capacitors is $10^{-2}$ joule/cm.$^3$, the density obtainable from the mechanical energy of flywheels is $10^2$ j./cm.$^3$, and the density obtainable from the chemical energy of powerful explosives is $10^4$ j./cm.$^3$, the time required to give off $10^6$ joules being respectively 5, $10^5$ and 1 microseconds.

Finally, in accordance with a special application of the invention, the central conductor 19 comprises a column of ionized gas or plasma traversed by an electric current which is sufficient to assure its striction; the compression of the azimuthal field of this plasma causes its confinement and permits the carrying out of thermonuclear fusion reactions.

Suitable conventional means, not shown, is employed to charge the capacitor bank 27, so that the charge accumulated therein may be employed to provide a current through the central conductor 19 by closing the switch 26.

While certain specific embodiments of a method and apparatus for producing a high density magnetic field have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. An apparatus for producing a high density magnetic field for use in controlled thermonuclear reactions comprising an evacuated chamber, means to produce an initial magnetic field at the central portion of said chamber, a metal envelope in the chamber surrounding and spaced from said means, and an explosive charge between said metal envelope and the internal peripheral wall of said chamber, and wherein said means comprises an axial conductor in the form of a plasma column in the chamber, said conductor carrying an electric current, and wherein said initial magnetic field is the azimuthal magnetic field of the conductor.

2. The structure of claim 1, and wherein said axial conductor comprises a column of ionized gas.

3. An apparatus for producing a high density magnetic field for use in controlled thermonuclear reactions comprising a generally cylindrical chamber, said chamber having opposite end walls, means electrically insulating said end walls from each other, means to substantially evacuate said chamber, axially located electric current-carrying means in the form of a plasma column in said chamber extending between said opposite end walls and producing an azimuthal magnetic field with respect to the axis of the chamber, a metal envelope in the chamber surrounding and spaced from said current-carrying means, and an explosive charge between said metal envelope and the internal peripheral wall of said chamber.

4. An apparatus for producing a high density magnetic field for use in controlled thermonuclear reactions comprising a generally cylindrical chamber, said chamber having opposite end walls, means electrically insulating said end walls from each other, means to substantially evacuate said chamber, axially located electric current-carrying means in the form of a plasma column in said chamber extending between said opposite end walls and producing an azimuthal magnetic field with respect to the axis of the chamber, an annular metal envelope mounted coaxially in the chamber and surrounding and being spaced from said current-carrying means, said annular metal envelope being spaced from the internal peripheral wall of the chamber to define an annular space therebetween, and an explosive charge in said annular space.

5. The structure of claim 4, and wherein said electric current-carrying means comprises a column of ionized gas.

6. The structure of claim 3, and a current supply circuit connected to said opposite end walls and including a capacitor.

References Cited

FOREIGN PATENTS 942,705  11/1963  Great Britain.

OTHER REFERENCES

Fowler et al., Journal of Applied Physics, 31 (1960) pp. 588–594.

REUBEN EPSTEIN, *Primary Examiner.*

ARTHUR GAUSS, *Examiner.*

C. R. CAMPBELL, *Assistant Examiner.*

UNITED STATES PATENT OFFICE

CERTIFICATE OF CORRECTION

Patent No. 3,338,788 August 29, 1967

Jiri George Linhart

It is hereby certified that error appears in the above numbered patent requiring correction and that the said Letters Patent should read as corrected below.

Column 1, lines 34 to 36, the formula should appear as shown below instead of as in the patent:

$$p = 2nkT = \frac{B^2}{8\pi}$$

Signed and sealed this 5th day of November 1968.

(SEAL)
Attest:

Edward M. Fletcher, Jr.
Attesting Officer

EDWARD J. BRENNER
Commissioner of Patents